June 3, 1930.  L. KARLOVITZ  1,761,478

DRIVING GEAR FOR MOTOR DRIVEN VEHICLES

Filed Aug. 1, 1928

Inventor:
L. Karlovitz
By: Marks & Clark
Attys.

Patented June 3, 1930

1,761,478

UNITED STATES PATENT OFFICE

LÁSZLÓ KARLOVITZ, OF BUDAPEST, HUNGARY

DRIVING GEAR FOR MOTOR-DRIVEN VEHICLES

Application filed August 1, 1928, Serial No. 296,816, and in Hungary August 24, 1927.

This invention relates to a driving gear for motor driven vehicles more particularly for electric locomotives having the driving motor positioned above the driving axles on the frame of the vehicle. In designing the driving gear for this type of vehicle the difficulty has to be reckoned with, that owing to the springing of the vehicle frame, oscillatory motions occur between the driving motor and the driving axles, which cause the distance between the driving and the driven pin to vary within certain limits. The power of the driving motor must be transmitted to the driving axles in such a manner as to prevent the occurrence in the rod work of detrimental strains due to the springing.

The new driving gear is so constructed that it allows of the relative motions between the frame and the wheels due to the springing of the vehicle frame without necessitating the provision of separate constructional parts which can adjust themselves in a yielding manner, to which must be added the further advantage of the perfectly uniform transmission of the driving torque.

According to the invention both the driving and the driven shaft is provided with at least two double cranks offset by 180°, which are positioned similarly on both the driving and the driven part, each two crosswise oppositely positioned crank pins being connected together by a driving gear, the separate, power-transmitting parts of which are guided by members which are mounted on a shaft lying in the point of intersection of the straight lines connecting the crank pins lying cross-wise opposite one another, which shaft is capable of moving freely in space. In this arrangement the motion of the driving gear is such that the end of each driving gear connected to the driven crank pin exactly copies the movements of that end of the driving mechanism which is connected to the driven crank pin. Each two interconnected crank pins move in the opposite sense with respect to the point of intersection of the straight lines connecting them, the reaction forces neutralizing one another in the point of intersection which is referred to below as the pole. The shaft located in the pole thus oscillates freely and gives way to the motions due to the springing of the vehicle frame, without any further strains occurring in the rod work of the driving gear.

Figure 1:
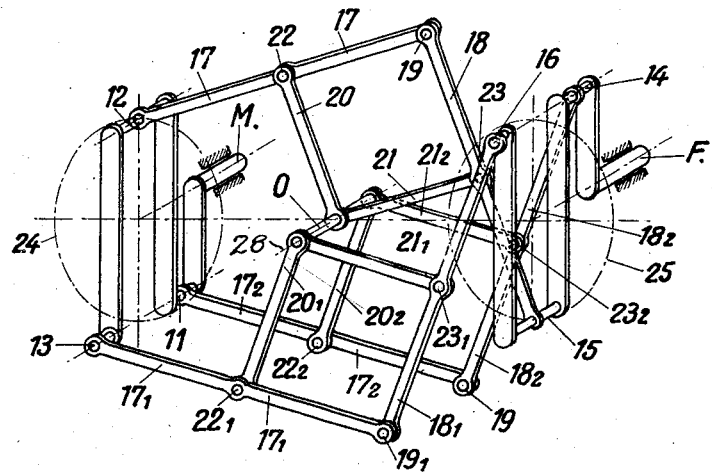
Figure 2:
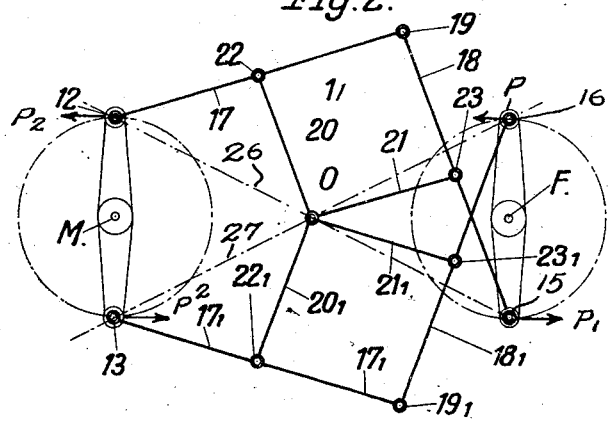

In the accompanying drawing, Figure 1 shows the essence of the invention diagrammatically, Figure 2 is a diagrammatic front elevation of the arrangement shown in Figure 1.

In Figure 1, M is the driving crankshaft, in the present case the motor shaft, and F is the driven crankshaft, that is to say the vehicle axle. Each crankshaft has three cranks, the centre crank of the crankshaft M having its crank pin 12 offset at 180° with respect to the crank pins 11 and 13 on each side of it, while the crankshaft F has its centre crank with its crank pin 15 offset at 180° with respect to the crank pins 14 and 16 on each side of it. The two crankshafts are arranged with respect to one another so that the crank pins of the one are opposite the crank pins of the other. The pairs of opposite crank pins are connected diagonally crosswise to one another, the crank pin 12 to the crank pin 15 by means of two rods 17 and 18, the crank pin 13 to the crank pin 16 by means of two rods $17_1$ and $18_1$ and the crank pin 11 to the crank pin 14 by two rods $17_2$ and $18_2$, the two rods of each pair being pivotally connected together at their opposite ends by means of pivot pins 19, $19_1$ and $19_2$ respectively. Each of the rods 17, 18 is connected by a link 20, 21 respectively to a shaft O, which is rotatable about an axis 28 lying in the plane joining the axes of rotation of the shafts M and F. The axis O is so positioned that it intersects the straight lines drawn diagonally crosswise through the axes of the opposite crank pins of the two crankshafts. In the diagrammatic elevation shown in Figure 2, two of such straight lines 26, 27 drawn through the axes of the crank pins 12, 15 and 13, 16 respectively, are shown in dot and dash lines. The links 20, 21 are oscillatable about the shaft O and are connected to the corresponding rods 17, 18 by means of pivot pins 22, 23, respectively. The rods $17_1$, $18_1$, which connect together the crank pins 13 and 16 are connected to the shaft O in a similar manner by means of links $20_1$ and $21_1$, connected to the respective rods by means of pivot pins $22_1$ and $23_1$. In like manner, the rods $17_2$, $18_2$ of the crank pins 11, 14 are connected to the shaft O by means of links $20_2$, $21_2$ connected to the rods $17_2$, $18_2$ by means of pivot pins $22_2$, $23_2$, respectively.

As will be clearly seen from Figure 2, the mechanism which couples the crank pin 12 diagonally crosswise to the crank pin 15 is exactly similar to and is the reversed image of the mechanism which couples the crank pin 13 to the crank pin 16. It will also be seen from Figure 2 that the circular paths 24 and 25 of the crank pins 11, 12, 13 and 14, 15, 16 are of the same diameter and consequently the pole O, that is the point of intersection of the connecting lines 26 and 27 lies in the middle between the two shafts M and F, a symmetrical driving gear thus resulting for each pair of connecting crank pins, having connecting rods 17, 18; $17_1$, $18_1$; $17_2$, $18_2$ and so on, of equal length. When the two shafts M and F approach one another or recede from one another, for instance due to springing between the vehicle frame and the under carriage, the pole or the shaft O mounted in the same will move each time by half the amount of the relative motions of the shafts M and F. The arrangement may of course be carried out with unequal crank paths 24 and 25, in which case the pole O will not lie in the middle but nearer to the smaller circular path. The freedom of reaction of the shaft O is independent of the dimensions, for the couple $P_1$, $P_1$ and $P_2$, $P_2$ (Fig. 2) acting at the couples 11, 14; 12, 15; 13, 16 produces in the pole O at every position of the cranks equal but opposite reaction forces, which neutralize one another. As the shaft O is free from reaction, it need not be journalled on the vehicle frame so that the possibility of the relative motion of the shafts M and F with respect to one another is ensured. The forces acting on the cranks of the driving gear are also all equal, so that the shafts M and F are also free from reaction. Finally the driving gear operates without dead centre positions. Many modifications of the driving gear besides that shown diagrammatically in Figure 1 are possible, without departing from the spirit of the invention.

In place of two crank pins and two driving gears several crank pins and several driving gears can be mounted on each shaft, symmetrically to one another so that the reaction forces in the pole O neutralize one another. It is also possible to interlink a plurality of the driving gears above described in the manner of a lazy tongs arrangement, which is particularly suitable for driving several pairs of driving wheels for one motor shaft.

What I claim is:—

1. A driving gear for motor driven vehicles, comprising in combination a driving crankshaft having at least two crank pins offset at 180° with respect to one another, a driven crankshaft having crank pins offset at 180° with respect to one another, said crankshafts being arranged with respect to one another with the crank pins of the one opposite the crank pins of the other, and means for coupling the crank pins of the driving crankshaft diagonally crosswise to the opposite crank pins of the driven crankshaft comprising a shaft arranged with its axis of rotation lying in the plane joining the axes of rotation of the crankshafts, and so as to intersect straight lines drawn diagonally crosswise through the axes of the opposite crank pins of the two crank shafts, connecting rods operatively connected to the said crank pins and power transmitting means on said shaft and operatively connected to said connecting rods, so as to couple together the connecting rods of the opposite crank pins with the latter diagonally crosswise to one another, as and for the purposes set forth.

2. A driving gear for motor driven vehicles, comprising in combination a driving crankshaft having at least two crank pins offset at 180° with respect to one another, a driven crankshaft having crank pins offset at 180° with respect to one another, said crankshafts being arranged with respect to one another with the crank pins of the one opposite the crank pins of the other, and means for coupling the crank pins of the driving crankshaft diagonally crosswise to the opposite crank pins of the driven crankshaft comprising a shaft arranged with its axis of rotation lying in the plane joining the axes of rotation of the crankshafts, and so as to intersect straight lines drawn diagonally crosswise through the axes of the opposite crank pins of the two crankshafts, connecting rods operatively connected to the said crank pins at one end and coupled to one another at the opposite end with the opposite crank pins of the two crankshafts diagonally crosswise to one another, and guiding means mounted on said shaft and connected to the pairs of coupled connecting rods for transmitting the power from the one connecting rod to the other, as and for the purposes set forth.

3. A driving gear for motor driven vehicles, comprising in combination a driving crankshaft having at least two crank pins offset at 180° with respect to one another, a driven crankshaft having crank pins offset at 180° with respect to one another, said crankshafts being arranged with respect to one another with the crank pins of the one opposite the crank pins of the other, and means for coupling the crank pins of the driving crankshaft diagonally crosswise to the opposite crank pins of the driven crankshaft comprising a shaft arranged with its axis of rotation lying in the plane joining the axes of rotation of the crankshafts, and so as to intersect straight lines drawn diagonally crosswise through the axes of the opposite crank pins of the two crankshafts, connecting rods operatively connected to the said crank pins at one end and coupled to one another at the opposite end with the opposite crank pins of the two crankshafts diagonally crosswise to one another, and links pivoted on said shaft and to said connecting rods intermediate the ends of the latter, as and for the purposes set forth.

4. A driving gear for motor driven vehicles, comprising in combination a driving crankshaft having three crank pins with the central crank pin offset at 180° with respect to the crank pins on either side of it, a driven crank shaft having three crank pins with the central crank pin offset at 180° with respect to the crank pins on either side of it, said crankshafts being arranged with respect to one another with the crank pins of the one opposite the crank pins of the other, and means for coupling the crank pins of the driving crankshaft diagonally crosswise to the opposite crank pins of the driven crankshaft comprising a shaft arranged with its axis of rotation lying in the plane joining the axes of rotation of the crankshafts, and so as to intersect straight lines drawn diagonally crosswise through the axes of the opposite crank pins of the two crankshafts, connecting rods operatively connected to the said crank pins at one end and coupled to one another at the opposite end with the opposite crank pins of the two crankshafts diagonally crosswise to one another, and guiding means mounted on said shaft and connected to the pairs of coupled connecting rods for transmitting the power from the one connecting rod to the other, as and for the purposes set forth.

In testimony whereof I have signed my name to this specification.

LÁSZLÓ KARLOVITZ.